DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 8

T946,006

PROCESS FOR COATING FILMS

Roger Sidney Arthur Kelly, Stevenage, and John Robert Wilson, Knebworth, England, assignors to Imperial Chemicals Industries Limited, London, England

Filed Mar. 24, 1975, Ser. No. 561,664

Claims priority, application Great Britain, Mar. 29, 1974, 13,992/74

Int. Cl. B32b *5/16, 27/08, 3/00*

U.S. Cl. 428—129

No Drawing. 18 Pages Specification

A process for the production of a coated film is disclosed which comprises coating a self-supporting synthetic plastics film such as polyethylene terephthalate with an aqueous latex or solution comprising an unhydrolysed or a partially hydrolysed polymer or copolymer of vinyl acetate, the copolymer formed with a comonomer comprising a dialkyl maleate, 2-ethylhexyl acrylate, ethylene vinyl chloride or a vinyl ester of versatic acid and comprising at least 50 (preferably 70–90) mole percent of vinyl acetate, and one or more resinous components capable of intra-molecular cross-linking. These materials include epoxy resins, alkyd resins and the condensation product of melamine and formaldehyde.

Coated films thus prepared are useful as magnetic recording materials, drafting films, slot liners for electrical motors, packing materials and as a carrier for the releasable layer in carbon paper. The end use of the coated films so prepared depend upon the nature and amount of additives contained in the aqueous coating latex or solution. For example, finely divided silica particles included in the coating may be used to produce a drafting or writing film having a rough surface thereon for receiving pencil markings or the like.

The disclosed procedure has advantage in that the coating is applied after processing of the base material, as in the case of polyethylene terephthalate after biaxial orientation and heat setting.